Dec. 6, 1960     B. C. GOLDEN     2,962,989
BAG MAKING MACHINE
Filed Aug. 23, 1957     16 Sheets-Sheet 3
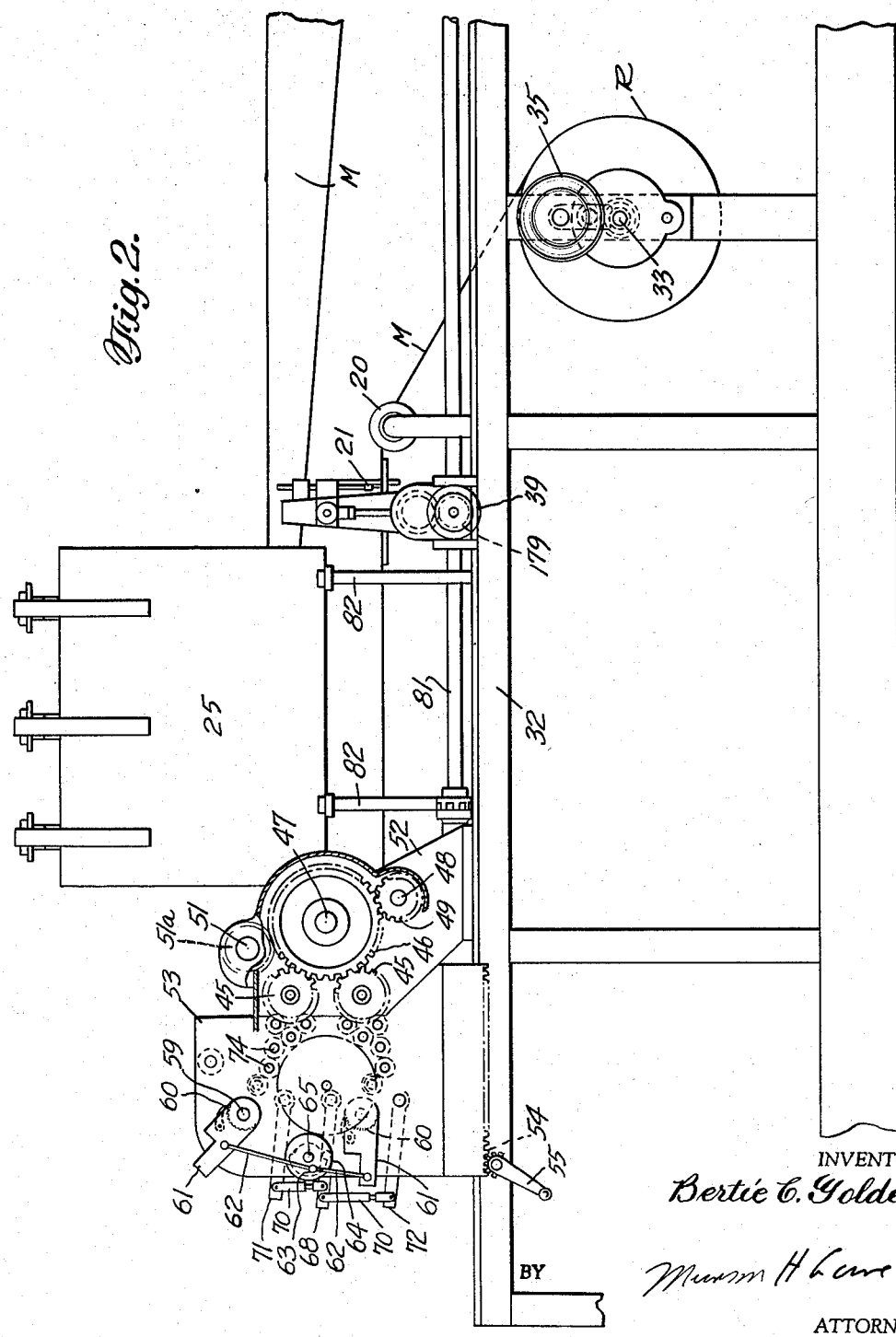
INVENTOR
Bertie C. Golden,
ATTORNEY

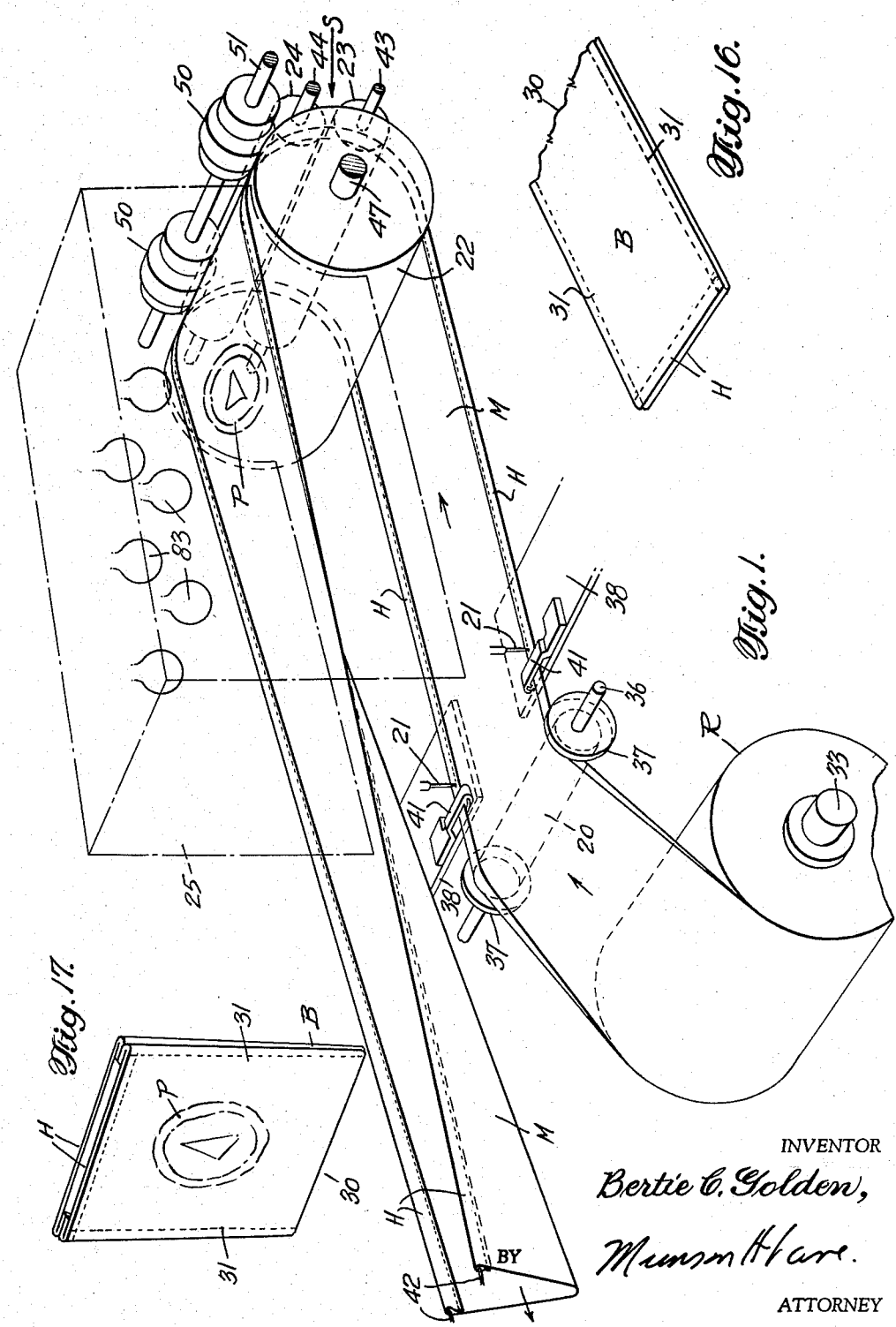

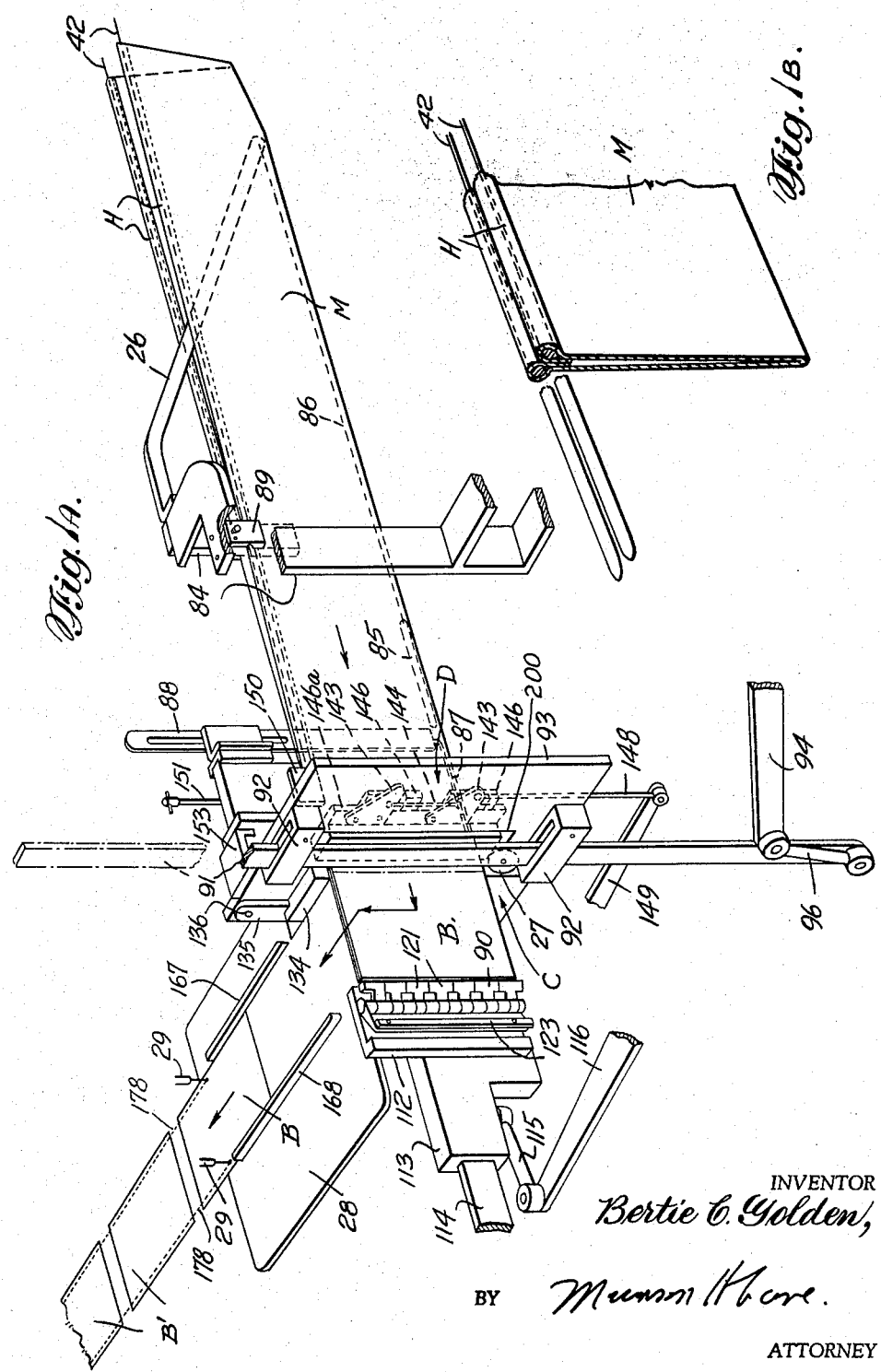

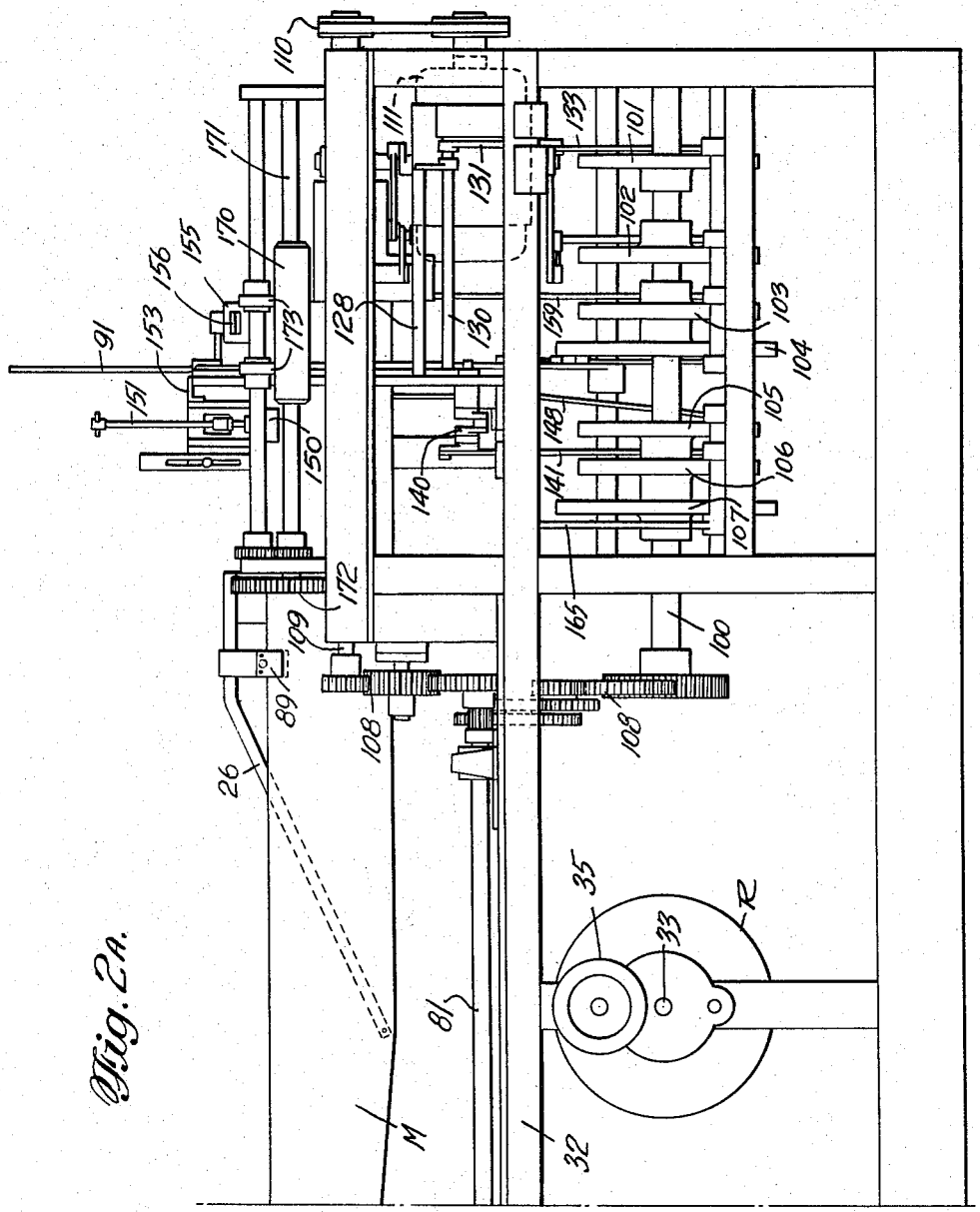

Dec. 6, 1960 B. C. GOLDEN 2,962,989
BAG MAKING MACHINE
Filed Aug. 23, 1957 16 Sheets-Sheet 5

INVENTOR
Bertie C. Golden,
BY
ATTORNEY

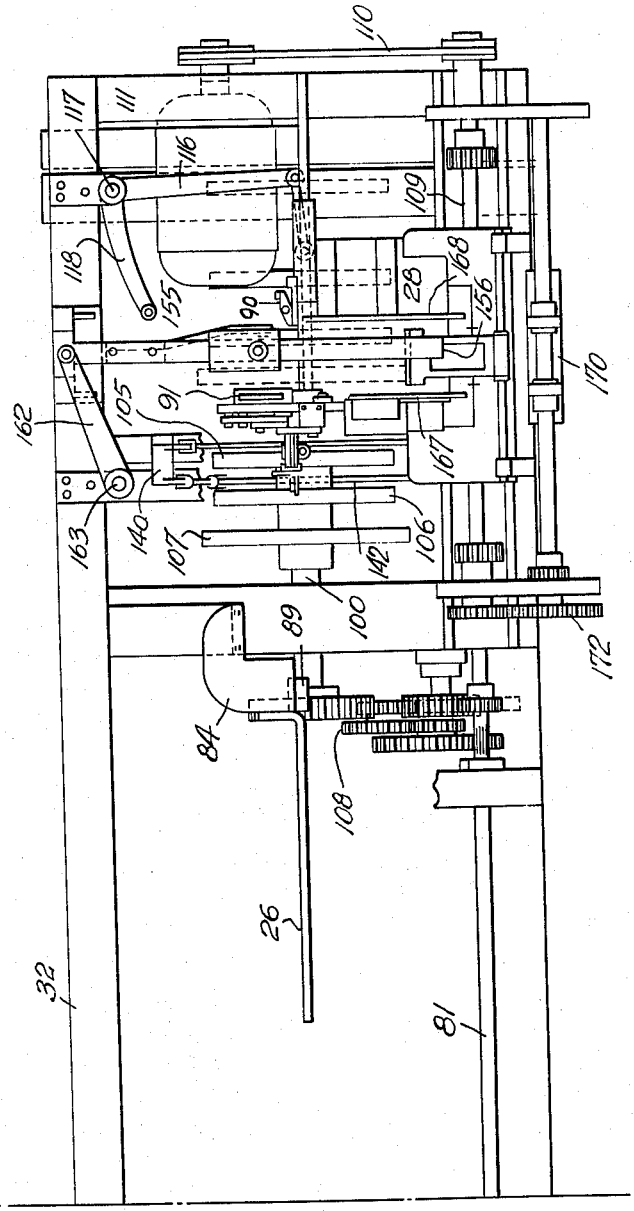

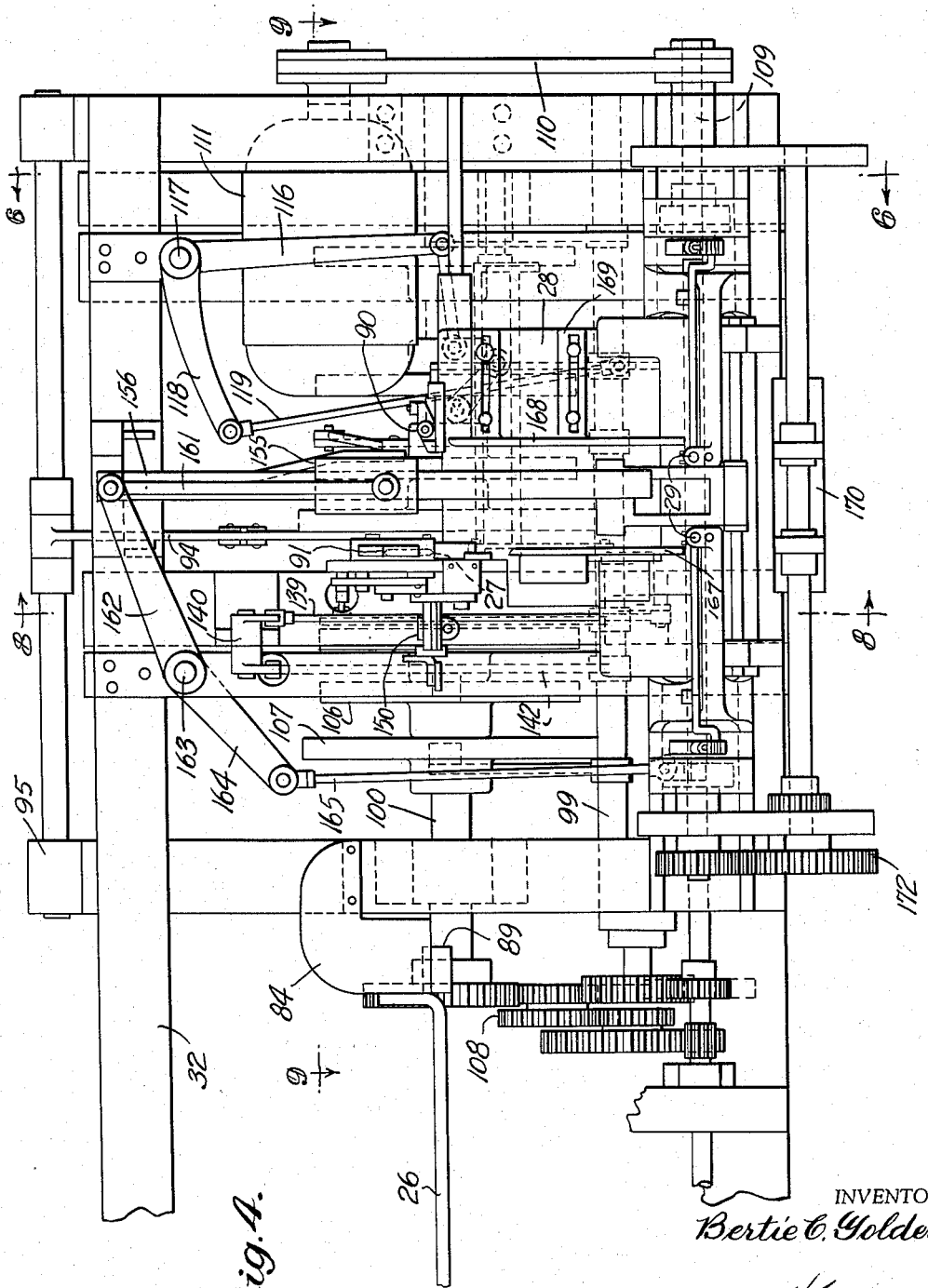

Dec. 6, 1960

B. C. GOLDEN 2,962,989

BAG MAKING MACHINE

Filed Aug. 23, 1957

INVENTOR

Bertie C. Golden,

BY

ATTORNEY

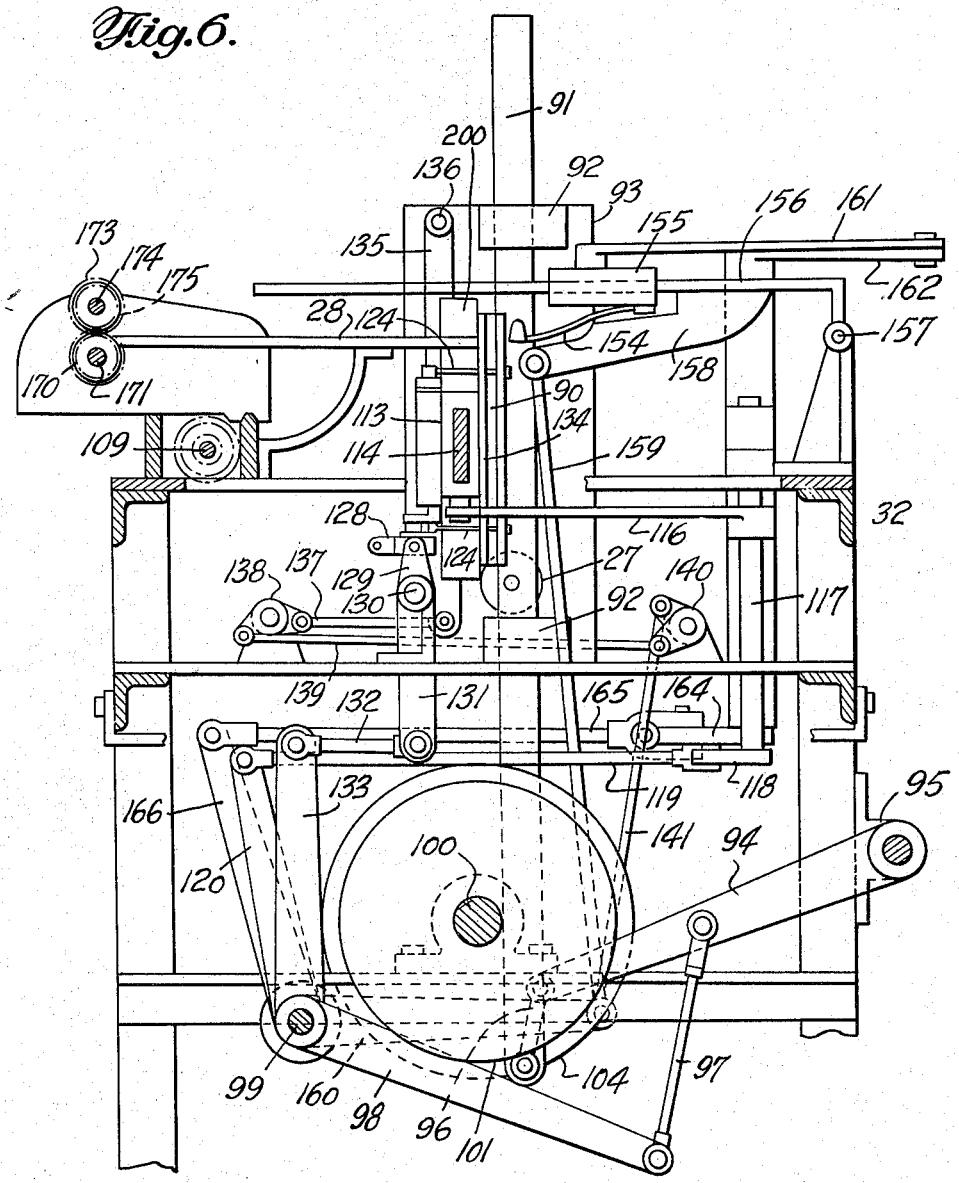

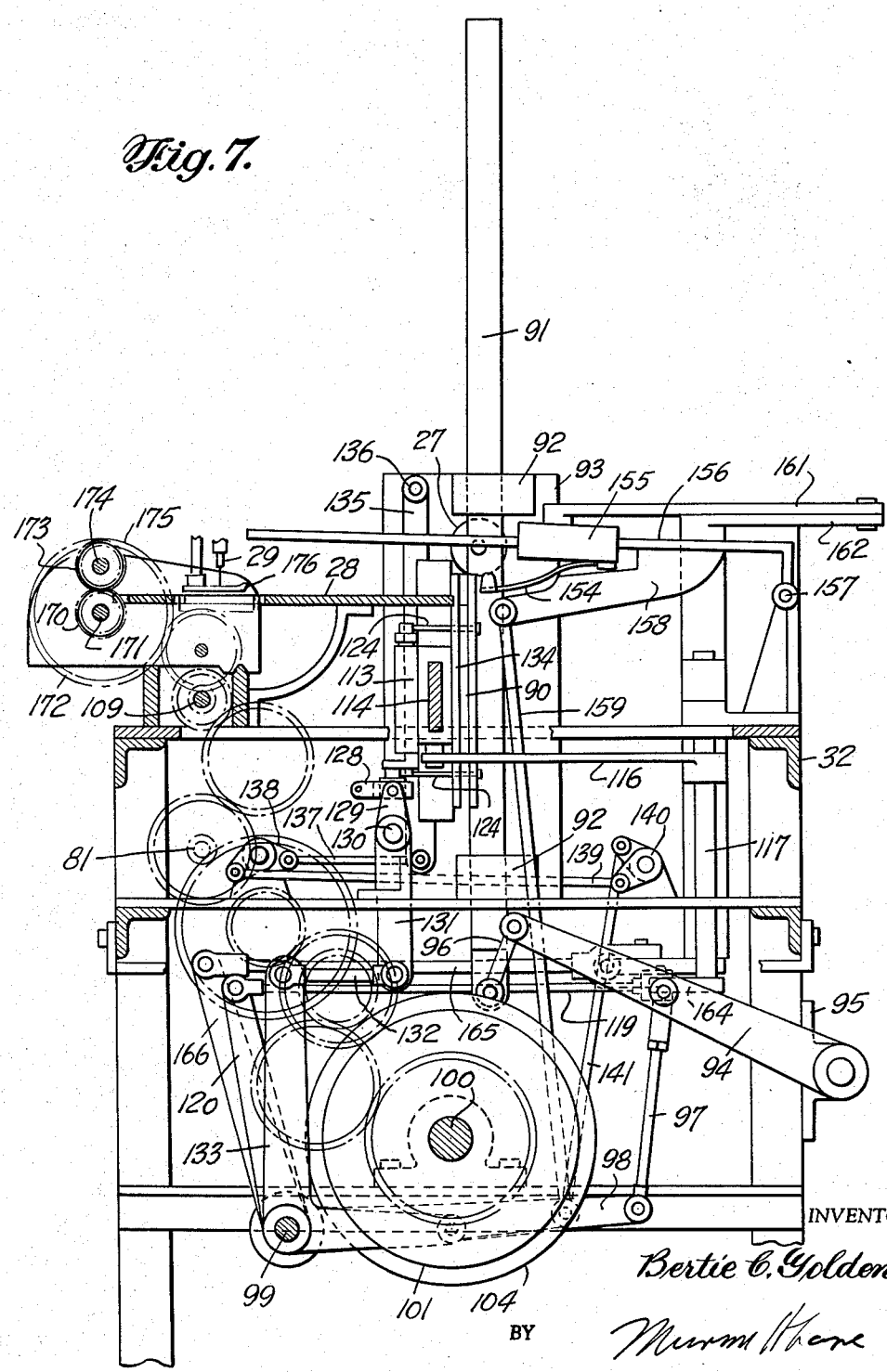

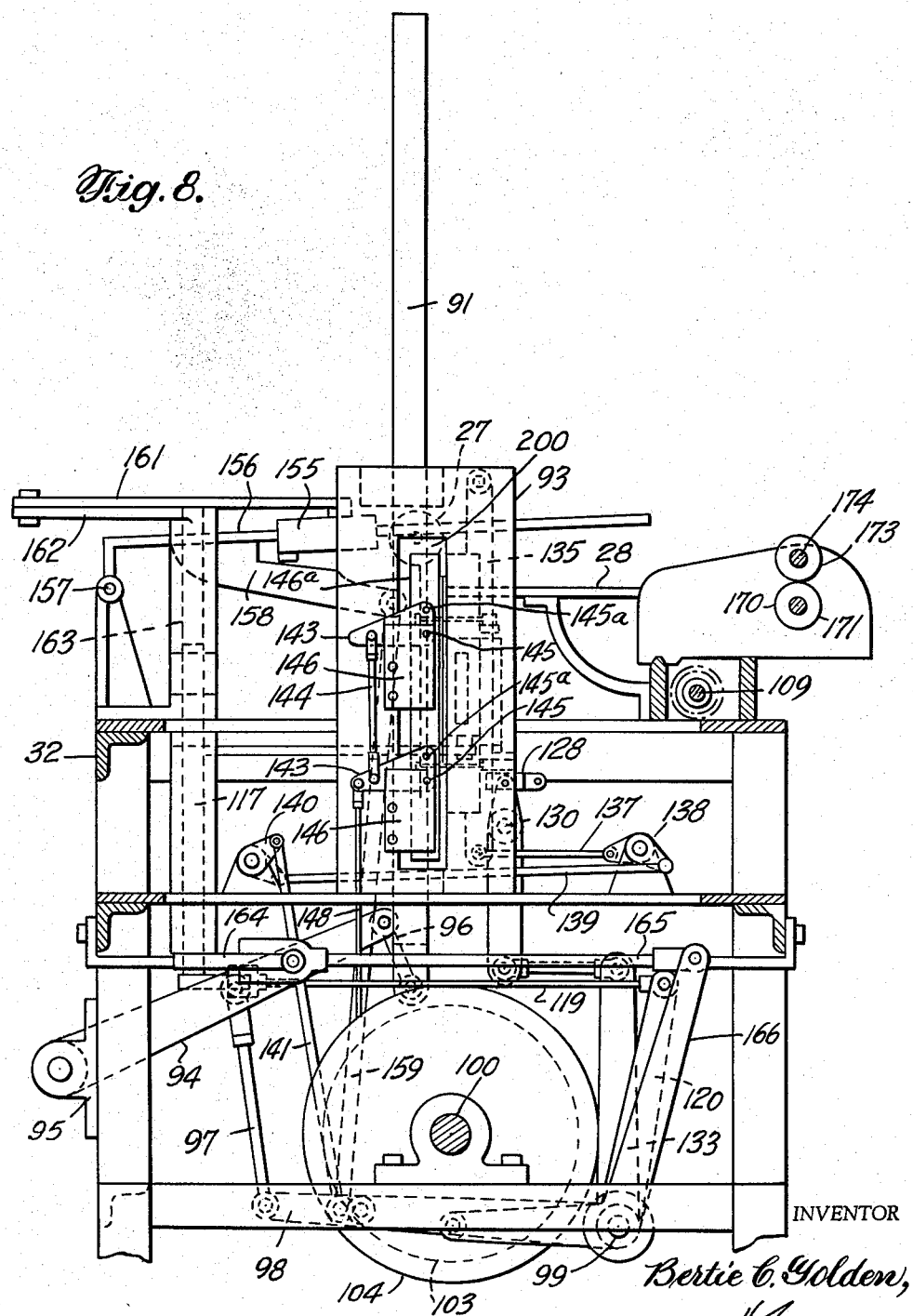

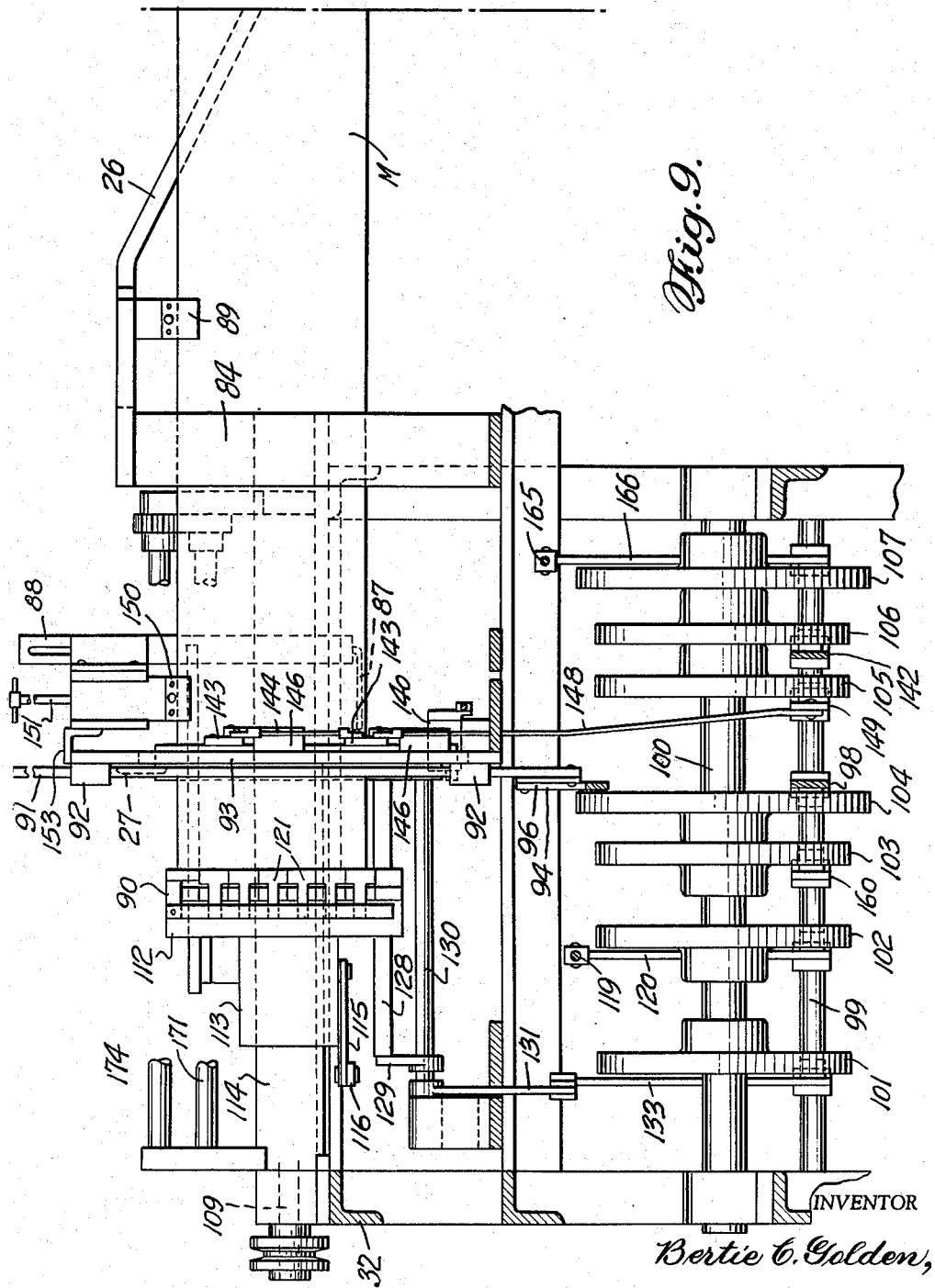

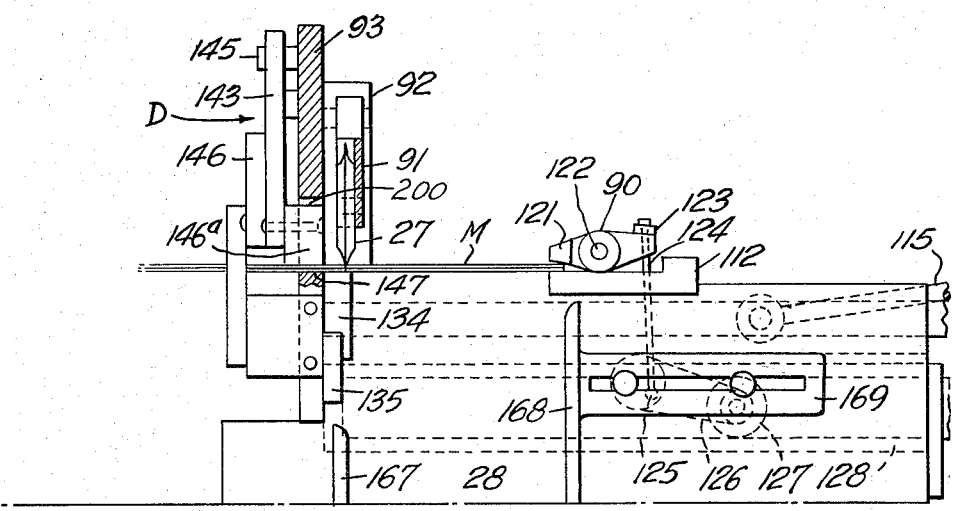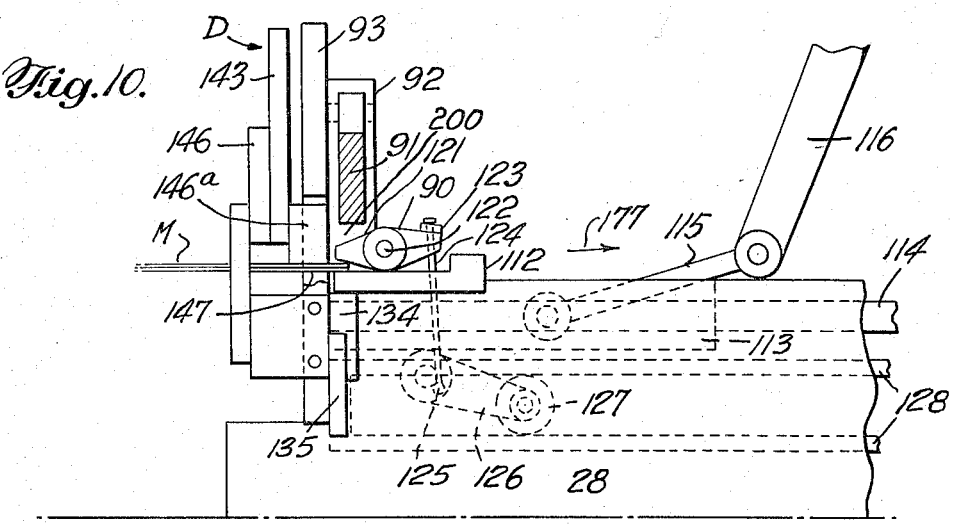

INVENTOR
Bertie C. Golden,
BY
ATTORNEY

Dec. 6, 1960

B. C. GOLDEN 2,962,989

BAG MAKING MACHINE

Filed Aug. 23, 1957

INVENTOR
Bertie C. Golden,

BY *Mumm Khare*

ATTORNEY

United States Patent Office 2,962,989
Patented Dec. 6, 1960

2,962,989

BAG MAKING MACHINE

Bertie C. Golden, Richmond, Va., assignor to Millhiser Bag Co., Inc., Richmond, Va., a corporation of Virginia Filed Aug. 23, 1957, Ser. No. 679,982

10 Claims. (Cl. 112—10)

This invention relates to new and useful improvements in bag making machines, particularly machines of the general type disclosed in my U.S. Patent No. 2,667,132, issued on January 26, 1954.

Briefly speaking, in a machine of this type hems are first sewn at opposite side edges of material in web form, whereupon the web is doubled longitudinally upon itself so that the hems are at the top and the fold line of the doubled web is at the bottom of the bags being made; the doubled web then being transversely cut into individual bag forming members which are fed to a stitching station where the cut edges of the bag members are sewed with continuous stitching so that the bags emerge from the machine in chain formation. As such, the bags are inside out and are subsequently fed into another machine, such as for example, that disclosed in my U.S. Patent No. Re. 23,196, reissued on February 7, 1950, wherein the bags are reversed and equipped with draw strings in their hems.

The present invention has as an object the provision of improved means for advancing the folded web through the cutting station so that bag members of proper size may be accurately cut, and for handling the cut bag members so that they may be fed to the stitching station for accurate sewing of their cut edges.

Another feature of the present invention is to facilitate printing of labels or other indicia on the bags during their manufacture, the printing operation taking place on the web after it is hemmed but before it is longitudinally doubled upon itself, the web advancing operation being coordinated with the printing operation so that the printed material appears in proper position on the finished bags.

A further object of the invention is to provide means for feeding the printed web from which the bags are to be formed through subsequent operations in such a manner as to prevent smearing the printed bag portions until such time as the ink is throughly dried.

With the foregoing objects and features in view and such other objects and features as may become apparent as this specification proceeds, the invention will be understood from the following description taken in conjunction with the accompanying drawings, wherein like characters of reference are used to designate like parts, and wherein:

Figure 1 is a perspective view, largely diagrammatic in character, showing the material hemming and printing end portion of the machine;

Figure 1A is a perspective view, largely diagrammatic in character, showing the material cutting and bag stitching end portion of the machine;

Figure 1B is a detail perspective view showing in detail the rods and wire bag blank supporting means.

Figure 2 is a side elevational view of the end portion of the machine shown in Figure 1;

Figure 2A is a side elevational view of the end portion of the machine shown in Figure 1A;

Figure 3A is a top plan view of the end portion of the machine shown in Figure 2A;

Figure 4 is a top plan view, similar to that shown in Figure 3A, but on an enlarged scale;

Figure 6 is a cross-sectional view, taken substantially in the plane of the line 6—6 in Figure 4;

Figure 7 is a cross-sectional view, similar to that shown in Figure 6, but with the cutting knife in its raised position;

Figure 8 is a cross-sectional view, taken substantially in the plane of the line 8—8 in Figure 4;

Figure 9 is a longitudinal sectional view, taken substantially in the plane of the line 9—9 in Figure 4;

Figure 10 is a fragmentary horizontal sectional detail of the material gripping and cutting mechanism, shown at the commencement of the material advancing operation;

Figure 11 is a sectional detail, similar to that shown in Figure 10, but illustrating the parts at the end of the material advancing operation;

Figure 16 is a perspective view of one of the bags after it leaves the machine; and Figure 17 is a perspective view of a finished bag.

Figure 3:
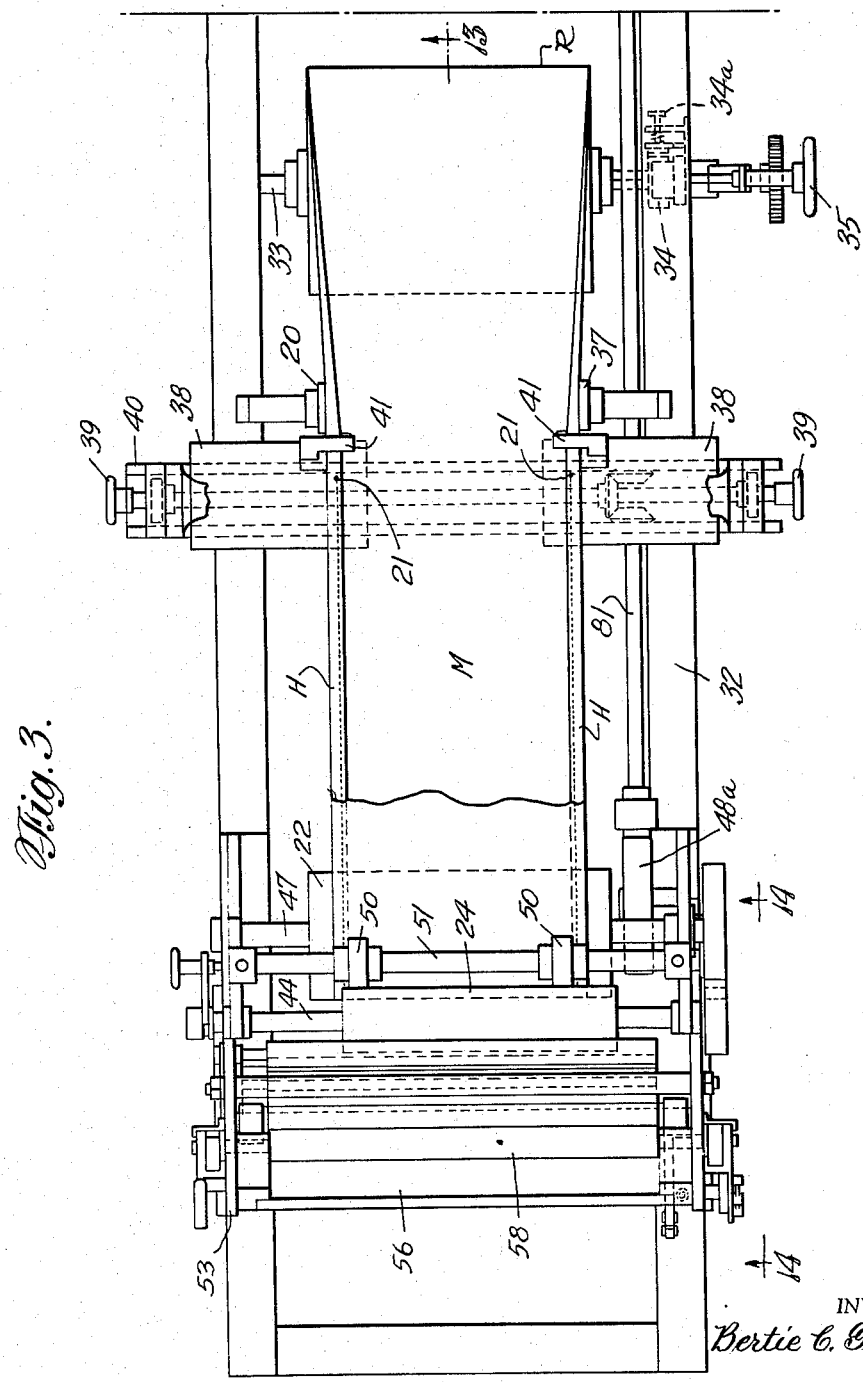
Figure 3 is a top plan view of the end portion of the machine shown in Figure 2.
Figure 5:
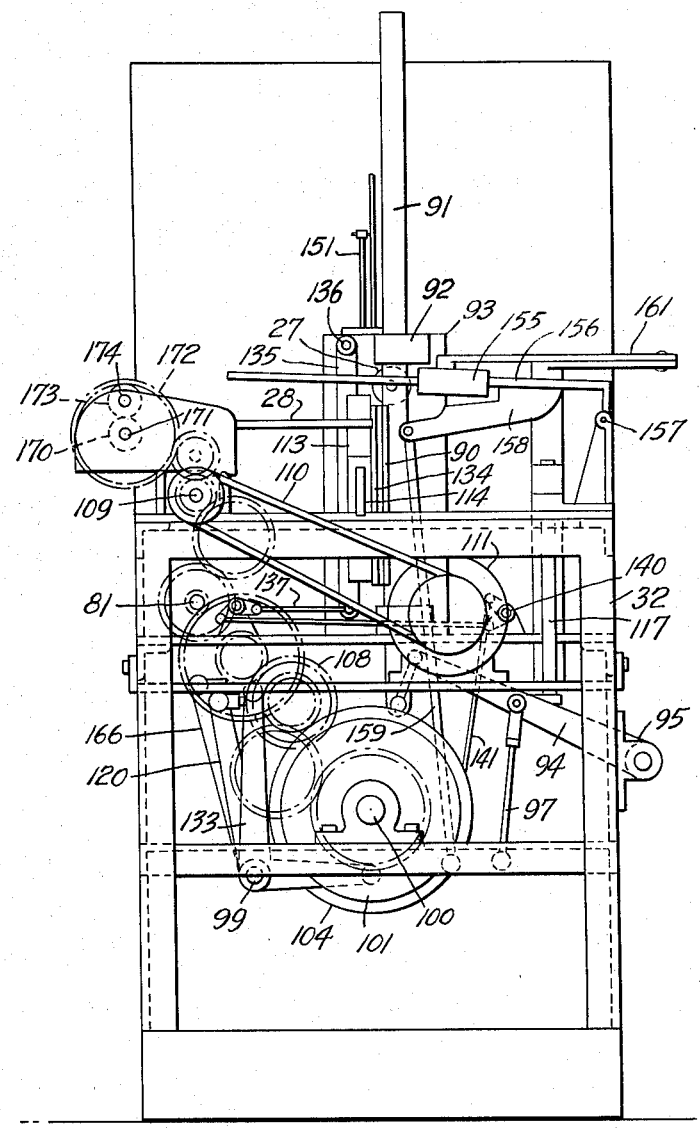
Figure 5 is an end elevational view of the machine showing the end portion illustrated in Figure 2A.
Figure 12:
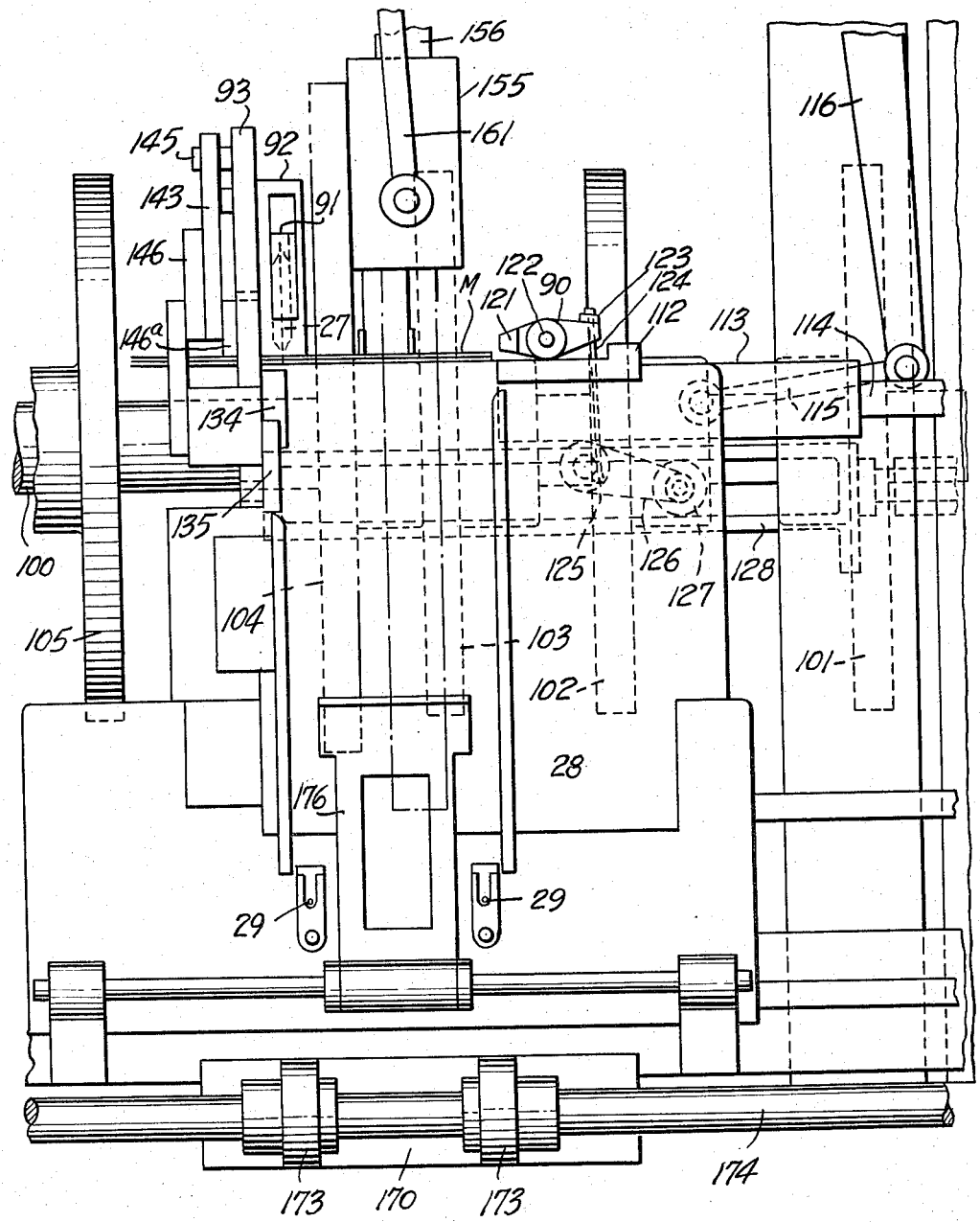
Figure 12 is a fragmentary top plan view of the material gripping and cutting mechanism at the end of the material advancing operation and in readiness to transfer the cut material to the bag stitching station.

Referring now to the accompanying drawings in detail, more particularly to the diagrammatic illustrations of Figures 1 and 1A, the general arrangement of the present machine will be seen to comprise a web of material M which, after unwinding from a roll R, passes over a flanged roller 20 which doubles the longitudinal edges of the web so as to form hems H which are stitched by suitable sewing machine needles 21.

The hemmed web then passes around a printing drum 22 at the printing station S where labels or other indicia are printed on the web by a pair of printing rollers 23, 24 adapted to print in different colors. The hemmed and printed web then passes through a drying oven 25 to a creasing member 26 (Fig. 1A) which doubles the web longitudinally upon itself so that its hemmed edges are brought together.

As this occurs, the web which in its initial flat form was disposed in a horizontal plane assumes a vertical plane when it is doubled upon itself and is fed to a vertically reciprocable knife 27 at cutting station C which knife cuts the doubled web into individual bag members or blanks B. The bag members B are then individually transferred to a horizontal table 28 on which the cut side edges thereof are stitched by suitable sewing machine needles 29, the latter forming continuous stitch lines so that the bags are discharged from the machine in chain formation, as shown at B'.

It will be noted that the web is printed in such manner that the printed indicia P are at the inside of the formed bag members B when the web is longitudinally doubled at the creasing member 26, and that the bag members themselves are inside out upon emerging from the machine. As such, the bag members are subsequently fed to another machine (not shown) which reverses their inside out formation and places draw strings in their hems.

The accompanying Figure 16 shows one of the bags as completed by the present machine, the hems H being at the mouth of the bag, the longitudinal fold made by the creasing member 26 being at the bottom 30 of the bag, and the side edges cut by the knife 27 at cutting station C, being stitched by the needles 29, as indicated at 31. Figure 17 shows the same bag in its finished form after it has been reversed so that the printed indicia P are at the outside.

As will be noted from Fig. 17 the printed portion P is so arranged that in the completed bag B such printed portion is accurately spaced away from the side edges of the bag and is also spaced away from the mouth portion H and from the folded bottom portion 30 of the bag. This is made possible by the accurate adjustment and synchronization of the related parts of the machine, as will be more fully described hereinafter, and it is also of importance, as will be more fully described and pointed out, that the web, after printing, be engaged at the unprinted edge portions only thereof during the entire movement of the printed web through the machine, from the time the printed web leaves the printing rolls until the time the bags are formed in chain formation, as indicated at B' in Fig. 1A, thus preventing smearing of the printed bags before the ink from the printing rolls is fully dry. Moreover, even in subsequent bag stringing and reversing operations on the machine of Golden Reissue Patent No. 23,196 previously referred to, which may be used to form the completed bag of Fig. 17, the web is gripped only at the edge portions thereof, as will be apparent from a consideration of the machine of the reissue patent, so that even where the printed bags are passed immediately to the bag stringing and reversing machine, as is not always the case, there will be no smearing of the printed portion of the bag.

Figure 13:
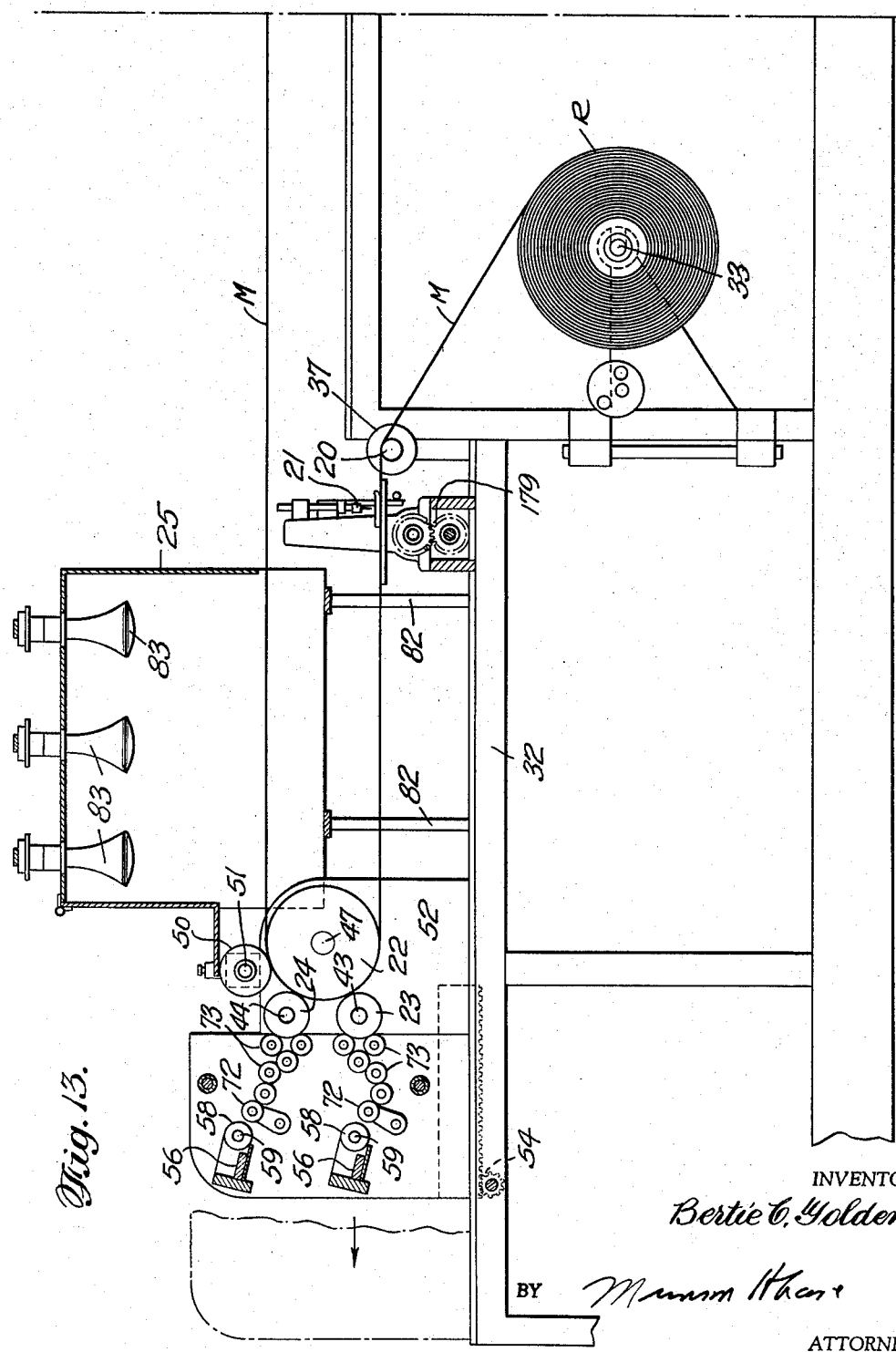
Figure 13 is a longitudinal sectional view, taken substantially in the plane of the line 13—13 in Figure 3.

With reference now to the accompanying Figures 2, 3 and 13, it will be noted that the machine comprises a horizontally elongated frame 32 which is provided intermediate the ends thereof with a cross shaft 33 to receive the aforementioned roll R from which the web M is unwound, the shaft 33 being equipped with suitable tensioning means 34, adjustable by a thumb screw 34a, and suitable means, adjustable by a hand wheel 35, are provided for axially adjusting the shaft 33 relative to the hem forming roller 20 so that the hems at the two sides of the web are of equal width. The roller 20, carried by a shaft 36 journalled in the frame 32, has the flanges 37 thereof adjustable toward and away from each other so as to accommodate webs of different widths to produce bags of correspondingly different depths or lengths, and the sewing machine units 21 may be similarly adjusted toward and away from each other to stitch the hems H formed by the roller 20. The sewing machine units 21 are carried by suitable slides 38 which also carry second hem folding means 41 which maintain the hems in proper relation to the needles of the sewing machines. Suitable hand wheels 39 are provided for turning over the sewing machines to enable the operator to raise the needles thereof for threading or similar other purposes. The slides 38 are movable upon a suitable cross bed 40.

A pair of guide wires 42 extend from the guides 41 around the printing drum 22 in parallel relation and then are mutually convergent while the web is being longitudinally doubled upon itself in its travel toward the knife 27, the guide wires 42 having the hems H slideable thereon after the hems are stitched by the needles 21.

Figure 14:
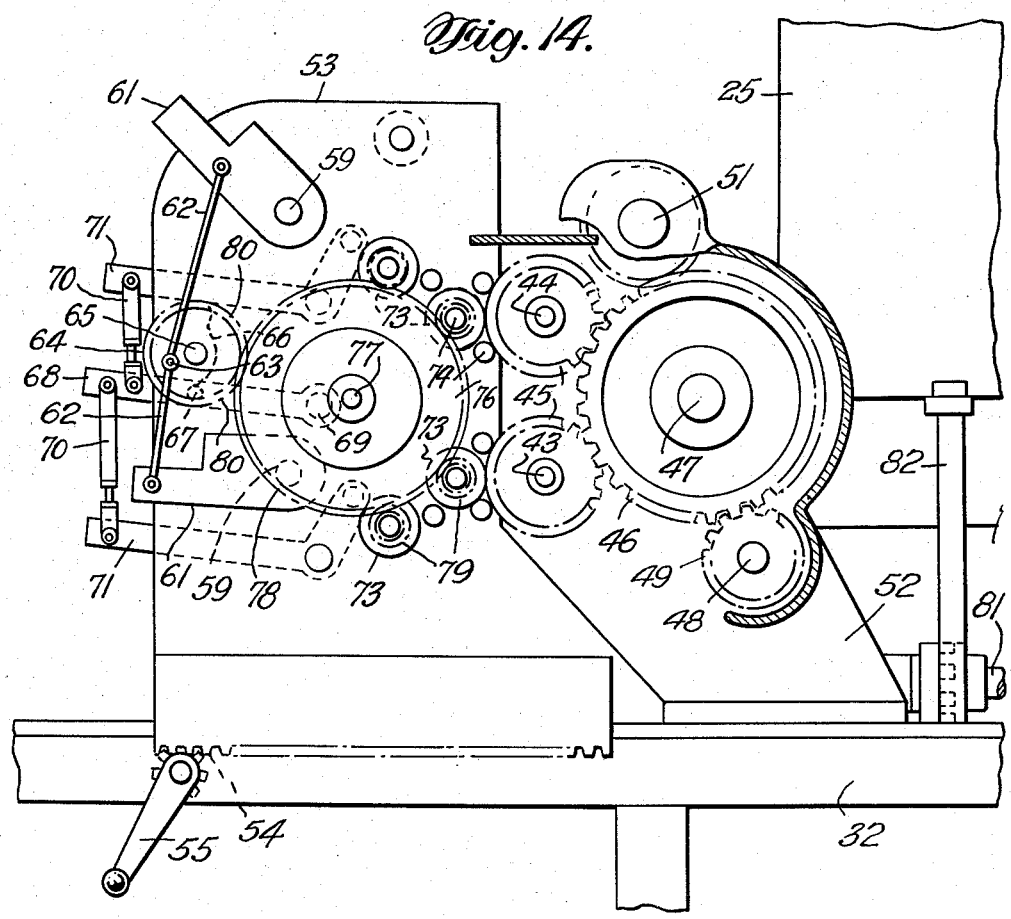
Figure 14 is a fragmentary side elevational view on an enlarged scale, taken substantially in the plane of the line 14—14 in Figure 3.

The web printing mechanism, best shown in Figures 2, 13 and 14, includes the aforementioned printing rollers 23, 24 carried by the respective shafts 43, 44 which are provided with gears 45 meshing with a gear 46 on the shaft 47 of the printing drum 22, so that the printing rollers rotate in a predetermined, fixed relation to the rotation of the drum. The web is fed to the drum and to the printing rollers by a pair of feed rollers 50 mounted on a shaft 51, the rollers 50 serving to press the web against the drum 22. The shaft 51 is provided at one end thereof with a gear 51a which meshes with the gear 46. The gear 46, in turn, is driven by a gear 49 on a shaft 48 projecting outwardly from a gear housing 48a.

The shafts 43, 44, 47, 48 and 51 are journalled in side supports 52 affixed to the frame 32, but the inking mechanism for the printing rollers 23, 24 is carried by a sub-frame 53 which is adjustable on the frame 32 toward and away from the printing rollers by a rack and pinion mechanism 54 actuated by a hand crank 55. The inking mechanism includes a pair of ink trays 56 having rollers 58 therein to receive the ink, the rollers 58 being secured to shafts 59 actuated by pawl and ratchet means 60 from a set of arms 61 which, in turn, are operatively connected by links 62 to a crank pin 63 on a disc 64 secured to a shaft 65.

Figure 15:
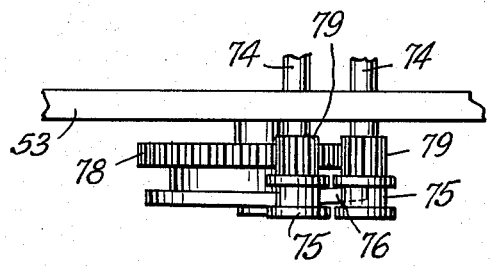
Figure 15 is a fragmentary plan view showing the actuating means for the inking rollers of the printing mechanism.

The shaft 65 also carries a cam 66 which operatively engages a pin 67 on a lever 68 which is pivoted to the sub-frame 53 at 69 and is connected by a pair of adjustable rods 70 to a pair of bell cranks 71. The bell cranks 71, in turn, carry a pair of transfer rollers 72 which transfer ink from the rollers 58 to two sets of secondary transfer rollers 73 which deliver ink to the printing rollers 23, 24. As shown in Figure 15, the shafts 74 which carry the rollers 73 are longitudinally slidable in the sub-frame 53 and are provided with grooved members 75 engaged by a cam 76 secured to a shaft 77. The latter is disposed centrally with respect to the shafts 74 and 65 and also carries a gear 78 meshing with pinions 79 on the shafts 74 and a gear 80 on the shaft 65.

It will be apparent from the foregoing that when rotation is imparted to the shaft 77, the resultant rotation of the shaft 65 will cause step-by-step rotation of the rollers 58 through the medium of the ratchet means 60, while at the same time the transfer rollers 72 will move alternately in and out of contact with the rollers 58 and 73, so as to eventually transfer ink to the printing rollers 23, 24. Moreover, rotation will be imparted through the gearing 78, 79 to the rollers 73 and longitudinal reciprocation will be imparted to these rollers through the medium of the cam means 75, 76.

The drive for the shaft 48 is taken through the gear box 48a from a drive shaft 81 which extends longitudinally of the frame 32 and is rotated by power means at the other end of the machine, as will be hereinafter described.

As already mentioned, after passing through the printing station, the hemmed and printed web M passes through a drying oven 25 which is in the form of a housing carried by suitable supports 82 on the frame 32 and containing a plurality of heat producing elements, such as for example, infra-red lamps 83.

Upon emerging from the oven which dries the ink printed on the web, the web, still guided by the wires 42, travels to the creasing member 26 which is in the form of an arm, inclined downwardly against the direction of travel of the web and supported on the frame 32 by a suitable bracket structure 84 so that it causes the web to be doubled or folded longitudinally upon itself while changing its plane of travel from the horizontal to the vertical. The mechanism hereinafter described, which advances the doubled web through the cutting means 27, operates in a step-by-step fashion while the web is delivered continuously from the already described printing mechanism. Accordingly, a suitable weight 85 of an elongated form is attached to the lower end of the arm 26 by a flexible element such as a cord or cable 86 and is disposed in the fold at the bottom of the doubled web after the latter leaves the arm 26, as illustrated in Figure 1A. The effect of the weight 85 on the region of the web between the member 26 and the knife 27, causes the web to take up slack within itself, incident to the stepby-step action of the advancing mechanism at one end and the continuous feed of the printing mechanism at the other.

In addition, a rod-shaped guide member 87, carried by a vertically adjustable support 88 on the frame 32, is provided in the crease or fold at the bottom of the doubled web, immediately adjacent the knife 27, as shown. Moreover, suitable guides 89 are provided on the bracket structure 84 for the hemmed edges H of the web, the guides 89 being adapted to accommodate the guide wires 42 as well as the hemmed edges of the material passing thereover.

The mechanism for handling the doubled web through the cutting station C comprises a deciprocable gripping unit 90 located beyond the station C which is movable in the vertical plane longitudinally of the web and causes the web to be pulled, one bag member at a time, past the knife 27. In cooperation therewith, means D hereinafter more fully described in connection with Figs. 10 and 11 are provided for firmly clamping the web which is being cut, such means being disposed in advance of and adjacent to the knife. The knife 27 itself, as shown, is in the form of a sharp-edged disc (Figs. 1A, 4, 5, 6, 7, 8, 11 and 12), rotatably mounted on a vertically reciprocable carrier 91 which is slidable in guides 92 on a vertical support plate 93 secured to the frame 32, and means 134 (Figs. 1A, 5, 6, 7 and 12) hereinafter described are also provided for backing the web against the knife while the cutting operation is in progress. As shown, the vertical plate 93 is perpendicular to the plane of the folded web, as best shown in Figs. 1A, 6, 7 and 8, and is vertically slotted as at 200 to permit the folded web to pass therethrough. This plate provides a support for many of the parts of the mechanism to be described, and the slot 200 forms a housing for the clamping bar 146a of the web gripping means to be more fully described hereinafter.

Knife carrier unit

The knife carrier 91 is reciprocated, as is best shown in Figure 6, by a lever 94 which is pivoted in a bearing 95 on the frame 32 and is connected to the carrier by a link 96. The lever 94 is actuated by a link 97 from a rocker arm 98 positioned on a shaft 99 extending longitudinally in the frame 32, parallel to a cam shaft 100. The shaft 100 carries a group of cams, 101, 102, 103, 104, 105, 106 and 107 (Fig. 9), and one of these cams, namely, the cam 104, is operatively engaged by the rocker arm 98 so as to impart reciprocating movement to the knife carrier when the shaft 100 is rotated.

The cam shaft 100 is driven through a chain of gears 108 (Fig. 2A) from a countershaft 109 which, in turn, is driven by a belt drive 110 from an electric motor 111 supported in the frame 32. One of the gears in the chain 108 also imparts rotation to the aforementioned shaft 81 which drives the printing mechanism at the other end of the machine.

Reciprocable hem gripping unit 90

The operation of the gripping unit 90 is best shown in Figures 10 and 11, wherein it will be noted that this unit comprises a vertically elongated holder 112 attached to a carrier 113 which is slidable on a horizontally elongated guide 114 on the frame 32. (See also Figures 1A and 9.) The carrier 113 is connected by a link 115 to a lever 116 secured to a vertical shaft 117 in the frame 32. As is best shown in Figures 4 and 6, the shaft 117 also carries an arm 118 which is connected by a link 119 to a rocker arm 120 on the aforementioned shaft 99, the arm 120 operatively engaging the cam 102 on the cam shaft 100.

The holder 112 carries a set of gripping fingers 121 pivotally mounted upon a vertical shaft 122. the fingers 121 being engaged by a vertical bar 123 whereby the fingers may be moved toward and away from the holder. The bar 123 is actuated by a pair of links 124 which are connected to eccentric pins 125 on a yoke 126 which is slidable with the carrier 113. The yoke 126 is provided with a roller 127 movably disposed in a slotted actuating member 128, the latter extending in parallel to the guide 114 and being supported by a pair of arm 129 secured to a shaft 130. The latter is also parallel to the guide 114 and it will be apparent that when the shaft 130 is rocked, the member 128 will be moved toward and away from the carrier 113, thus causing the gripping fingers 121 to open and close on the holder 112 by the action of the links 124.

The shaft 130 carries an arm 131 which is connected by a link 132 to a rocker arm 133 on the shaft 99, the arm 133, in turn, being in operative engagement with the cam 101 on the shaft 100.

Since, as has been previously pointed out in connection with the knife carrier unit, the knife carrier and the printing unit are coordinated through the cam shaft 100, gears 108 and drive shaft 81, and since the gripping unit 90 is also coordinated with these units through the cam shaft 100, it will be apparent that the printed material will appear in properly spaced position upon the finished bags.

Web backing mechanism (Figs. 1A, 5, 6, 7 and 8)

A vertically elongated pressure member 134 is provided to furnish a backing for the web M while it is being cut by the knife 27, this pressure member being supported by an arm 135 which is pivoted to the plate 93 as indicated at 136. The member 134 may be swung toward and away from the knife, this movement being effected by a link 137 which is connected to the lower end of the arm 135 and is operatively connected by rocker means 138 (see Figure 6) to another link 139 which, in turn, is operated through the medium of another rocker means 140 by a link 141 to a rocker arm 142. The latter is positioned on the shaft 99 and operatively engages the cam 106 on the shaft 100.

Web gripping unit D (Figs. 1A, 8, 9, 10 and 11)

The aforementioned web gripping means D for clamping the web M immediately adjacent the knife 27 while it is being cut and immediately thereafter, comprises a pair of vertically spaced, substantially triangular members 143 which are operatively connected together by a link 144, the members 143 being pivoted to blocks 146 at the points 145. The blocks 146 are secured to the plate 93 and a clamping bar 146a is pivoted to the blocks at the points 145a, so that when the members 143 are swung upwardly on the pivots 145, the clamping bar 146a presses the web M against the edge 147 of the vertical slot 200 formed in the plate 93. As will be apparent, the clamping bar 146a serves to grip the web in taut spaced relation to the reciprocating web grippers 90 during the cutting operation, as indicated in Fig. 11, and after the cutting operation the clamping bar 146a continues to grip the remaining free end portion of the web M until the web is again gripped by the grippers 90, as indicated in Fig. 10, at which time the clamping bar is retracted. An actuating rod 148 is connected to the lower of the members 143 and to a rocker arm 149 on the shaft 99, the arm 149 engaging the cam 105 on the shaft 100.

It may be noted at this point that the hemmed upper edges of the web M are also guided at a point adjacent the knife 27 by a guide block 150, vertically adjustable by a screw 151, and supported by bracket means 153 on the plate 93.

It will be noted that in the above operation both the clamping and gripping means engage the bag material at a point away from the printed portion, so that no smearing takes place.

Bag transfer mechanism (Figs. 6, 7 and 8)

When an individual bag member B has been severed by the knife 27 from the web M, it is transferred from its vertical position to a lying, horizontal position on the table 28, this being effected by engaging the upper end portion of the bag member by a prong 154 carried by a block 155 which is slidable on a rail 156, as is best shown in Figures 6 and 7. The rail 156 extends transversely of the machine frame and is pivoted thereto at the point 157 for raising and lowering movement, whereby the prong 154 may be engaged with and disengaged from the bag.

Raising and lowering of the rail 156 is effected by a lever 158 which is rigidly secured to the underside of the rail and is operatively connected by a link 159 to a rocker arm 160 on the shaft 99. The arm 160 engages the cam 103 on the shaft 100.

The slidable positioning of the block 155 on the rail 156 permits the prong 154 to shift the bag member B from its vertical position to the horizontal position on the table 28. The sliding of the block is effected by a link 161 which is pivoted to the block and to a crank 162 secured to a vertical shaft 163, the lower end of the shaft 163 being provided with a second crank 164 which is operatively connected by a link 165 to a rocker arm 166 on the shaft 99. The arm 166 engages the cam 107 on the shaft 100.

The bag B is deposited on the table 28 between a pair of guide rails 167, 168, the latter being equipped with slotted brackets 169 so that it may be adjusted toward and away from the rail 167 to suit the size of the bag. The bags are fed along the table by a roller 170 on a shaft 171 which is driven by suitable gearing 172 from the countershaft 109. The bags pass between the roller 170 and a pair of axially spaced rollers 173 (Figs. 2, 3, 4 and 12) disposed on top of the roller 170 on a shaft 174. The pair of axially spaced rollers 173 engage the bag members at spaced apart portions, no pressure being applied to the printed portions of the bag members lying between the two rollers 173, 173. The shaft 174 is operatively connected to the shaft 171 by suitable gearing 175. The aforementioned sewing machine needles 29 are disposed in advance of the rollers 170, 173, the bags being propelled along the table 28 under a foot-plate 176 of the sewing machine.

*Operation*

The various parts are arranged and synchronized in action so that the machine operates as follows:

Upon energization of the motor 111 (Figs. 2A, 3A, 4 and 5) rotation of the countershaft 109 and drive shaft 81 will impart rotation to the printing drum 22, causing unwinding of the web M from the roll R (Fig. 1). As the web travels over the flanged roller 20, the side edges of the web are turned or doubled upon themselves and are thereafter stitched by the sewing needles 21 to form the hems H.

As the hemmed web travels around the printing roller 22, the indicia P are printed thereon by the rollers 23, 24 printing, if desired, in two different colors. The printed indicia are subsequently partially dried as the web passes through the oven 25.

After emerging from the drying oven, the web M approaches the creasing member 26 (Fig. 1A) while the guide wires 42 supporting the hems of the web become gradually convergent, so that the web is doubled longitudinally upon itself in a vertical plane, as distinguished from the horizontal plane in which it was traveling from the roll R, through the printing apparatus and the drying oven. The advancing movement of the web is now effected primarily by the reciprocable gripping unit 90 which, when in the position shown in Figure 10, grips the free end of the web adjacent the knife 27 by its gripping fingers 121 acting against the holder 112.

In this position the pressure member 134 is away from the knife 27 and the clamping bar 146a is about to be withdrawn from the edge 147 of the plate 93, so that the gripping unit 90 will be free to pull the web past the plane of operation of the knife as indicated by the arrow 177 to the position shown in Figure 11. Thereupon, while the gripping unit 90 is still holding the free end of the web, the pressure member 134 is brought against the back side of the web and the clamping bar 146a is brought into engagement with the front side of the web so as to press the same against the edge 147 of the plate 93, thus firmly holding the web in readiness for the cutting operation. At this time all slack has been taken up in the web, and due to the interconnection between the operating means for the printing mechanism and the gripping mechanism the portion of the web between the gripping unit 90 and the clamping bar 146a includes a printed portion P (Fig. 17) accurately spaced from the margins of that portion of the web which is to be cut off. This portion is held taut between the grippers 90 and the clamping bar 146a.

With the web so firmly held, the cutting is effected by the knife 27 moving downwardly from the top to the bottom of the web by a corresponding movement of its carrier 91, the pressure member 134 providing an effective backing against which the knife may press to cut the web.

When the cutting is completed, the web engaging action of the gripping unit 90, pressure member 134 is released, and the individual bag member B is engaged by the transfer prong 154 which transfers the bag member from its vertical position to a horizontal lying position on the table 28. The clamping bar 146a on the other hand continues to press the free end of the web against the side margin 147 of the slot 200 in the separator plate 93 for a short time after release of the cut bag member B, until such time as the free end of the web is again gripped by the fingers of the reciprocable gripper unit 90. During this period the web continues to move from the printing rollers and the resulting slack is taken up by the weight 85 and associated slack take-up mechanism. At the proper time, the gripping unit 90 is returned to its initial position adjacent the knife 27, the gripping fingers 121 remaining open in readiness to again engage the free end of the web M at the knife, and the knife itself is raised by the carrier 91 in readiness for the next cycle of operation.

While the feeding of the web through the hemming and printing apparatus is continuous under the action of the constantly rotating roller 22, the pulling of the web past the knife is intermittent in view of the alternately gripping and releasing, reciprocatory movement of the gripping unit 90. Thus, when the gripping unit is idle during its return movement toward the knife 27, a certain amount of slack is developed in the web between the roller 22 and the knife, this slack being effectively absorbed by the action of the weight 85 resting in the bottom fold or crease of the web, after the web passes the member 26.

After being deposited on the table 28 by the prong 154, the bag members B are stitched at their cut side edges by the sewing machine needles 29, this stitching being continuous as indicated at 178 in Figure 1A, so that the bags emerge from the rollers 170, 173 of the machine in chain formation and in readiness to be fed to another machine (not shown) for turning the same right-side-in and equipping the hems thereof with draw strings.

The operation of the mechanism is such that the rail 156 is lowered and the block 155 is slid toward the table 28 to bring the prong 154 in engagement with the bag, whereupon continued movement of the block causes the prong to transfer the bag to the table 28. At that point the rail 156 is raised to disengage the prong 154 from the bag and the block 155 is retracted on the rail, in readiness for engagement of the prong with the succeeding bag.

As already noted, the aforementioned guide wires 42 extend from the guides 41 at the sewing needles 21, around the printing drum 22, and have their convergent ends anchored in the guide block 150, at which point the hems H of the web leave the guide wires and the latter do not interfere with the cutting action of the knife 27.

The sewing machine needles 21, 29 may be driven by independent motors, or if desired, they may be operatively connected to the motor 111, as exemplified by the operative connection of the needles 21 through the gearing 179 with the drive shaft 81.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a bag making machine, the combination of web feeding means for continuously advancing a web from a web supply, means in advance of said web feeding means for forming hems at opposite side edges of the continuously advancing web, means beyond the web feeding means for doubling the hemmed web longitudinally upon itself, knife means beyond the doubling means for cutting the doubled web transversely to form individual bag members, reciprocable gripper means engageable with the forward end of the doubled web beyond the knife means for intermittently advancing the same past said knife means and holding the web taut, intermittent web clamping means provided in advance of and adjacent the knife means and cooperating with said gripper means for supporting a portion of the web sufficient to form a bag between them in taut condition while being cut, slack take-up means intermediate the continuous web feeding means and said intermittent web clamping means, mean for stitching cut side edges of the individual bag members, transfer means for feeding the bag members cut from said knife means to the stitching means, and means, independent of the clamping means and located intermediate the gripper means and the clamping means, for backing the web against said knife means during the cutting operation.

2. In a bag making machine, propelling means for continuously advancing a web, means for forming hems at opposite side edges of the advancing web, means for doubling the web back longitudinally upon itself, knife means for cutting the doubled web transversely to form individual bag members, reciprocal gripper members engageable with the forward end of the doubled web and movable toward and away from the cutters to successively engage a free end of the web and to intermittently draw it taut past the knife means, means for intermittently clamping the taut web in advance of but adjacent to the knife means during and immediately after the cutting operation, slack take-up means engaging the web intermediate said continuous propelling means and said intermittent web clamping means to take up slack in the advancing web portion while the front portion of the web is gripped and clamped, means for stitching the cut side edges of the bag members, means for feeding bag members from said knife means to said stitching means, and means actuating said web propelling means, web cutting means, reciprocal gripping means, web clamping means and bag member feeding means in accurate timed relation so that they may be fed to the stitching means to insure accurate sewing of the cut edges.

3. In a bag making machine, the combination of means for supporting a web in roll form in a horizontal position, means for initially advancing the web in horizontal position from said roll comprising a horizontally disposed web engaging and propelling roller, means provided in advance of said propelling means for continuously forming hems at opposite side edges of the web prior to contact with the roller, means beyond the propelling means for continuously doubling the web longitudinally upon itself and transposing the doubled web into a vertical plane, knife means for cutting the doubled web transversely to form individual bag members, horizontally reciprocable gripper means beyond the web doubling means and successively engageable with the forward end of the doubled web for advancing the same past said knife means and holding the same taut, means in advance of but adjacent to the knife means and cooperating with said gripper means successively clamping and releasing the web in timed relation to the gripper means for holding a portion of the web between the clamping and gripping means while being cut to form bag members, and adapted to retain the free end of the web after the cutting operation until the same is again engaged by the gripper means, means independent of the clamping means for backing the web against the knife during the cutting operation, a horizontal bag receiving table adjacent the knife means, means for feeding successive bag members from the knife means to said table, and means on said table for stitching the cut side edges of the bag members.

4. In a bag making machine, the combination of means for supporting a roll of web in horizontally disposed position, web feeding means for continuously advancing the web from said roll in a horizontal plane, means in advance of said propelling means for forming hems at opposite side edges of the web, means in advance of said web feeding means for doubling the web longitudinally upon itself and transposing the same from a horizontal into a vertical plane, knife means beyond the doubling means for cutting the doubled web transversely into individual bag members, reciprocable web gripper means engageable with the forward end of the doubled web for intermittently advancing the same past said knife means and holding the same taut, means cooperating with said gripper means for intermittently clamping the web adjacent to and in advance of the knife during and immediately after cutting, means for moving said gripper means in and out of gripping engagement with the web, and means for intermittently actuating said clamping means in timed relation to said web gripper means.

5. In a bag making machine, the combination of means for continuously advancing a web in a horizontal plane, means for forming hems in opposite edges of the advancing web, means for doubling the web longitudinally of itself and transposing the same from a vertical to a horizontal plane, a vertically reciprocable bag cutter located beyond the doubling means, horizontally reciprocable gripper means located beyond the web doubling means movable toward and away from the cutter and adapted to engage the free end of a web for intermittently advancing a portion of the web past the cutter and holding the same taut, intermittently acting web clamping means disposed in advance of and adjacent to the cutter and adapted to coact with said gripping means for holding portions of the web at spaced positions during and immediately after the bag cutting operation, means for engaging said gripper means with the web and moving the gripper means away from the cutter while said clamping means are inoperative to pull out a bag forming portion of the web in taut condition, means for actuating said cutter while a bag forming portion of the web is held taut between said gripper means and said clamping means, means for actuating said cutter to cut off said held portion of the web to form a bag member, means independent of the clamping and gripper means and movable toward and away from said cutter for backing the web against the cutter, and means for stitching the cut off bag members.

6. In a bag making machine, the combination of means for supporting a web in horizontally disposed roll form, web feeding means for continuously advancing the web from the roll, means located in advance of the feeding means for forming hems at opposite side edges of the continuously moving web, a pair of hem engaging guide rods extending from the hem forming means and having mutually convergent end portions, means provided between said guide rods for doubling the web longitudinally upon itself and disposing the same in a vertical plane with the fold at the bottom edge of the doubled web, knife means located beyond the web doubling means for cutting off portions of the doubled web to form individual bag members, vertically elongated and horizontally reciprocable web gripper means successively engageable with a free end of the doubled web for intermittently advancing a bag forming portion of the web past said knife means and holding the same taut, means cooperating with said gripper means for intermittently clamping the web adjacent to but slightly in advance of said knife during and immediately after the cutting operation to retain between said gripping means and said clamping means a taut web portion sufficient to form a bag member while leaving an uncut portion clamped by said clamping means, means for actuating said gripping means, clamping means and cutting means in timed relation to one another, web slack take-up means located between the web doubling means and the intermittently acting web clamping means, a horizontal table provided on the frame adjacent the knife means, means for feeding successive bag members from a vertical position at the knife means to a horizontal position on said table, and means on said table for stitching cut side edges of the bag members.

7. In a bag making machine, the combination of a pair of spaced horizontal guide rods adapted to slidably receive hemmed side edges of a continuously moving web, said guide rods having mutually convergent end portions whereby the side edges of the web are brought together, web feeding means for continuously advancing the web, an arm disposed in a vertical plane between the convergent end portions of said rods and having its lower end engageable with the web along the medial longitudinal line thereof whereby the web may be doubled upon itself and disposed in a vertical plane while the side edges thereof are brought together by said guide rods, web cutting means comprising a vertically reciprocable knife member disposed beyond the convergent ends of said rods at one side of the path of movement of the web for cutting individual bag members from the forward end of the doubled web, a vertically elongated backing member disposed in the plane of reciprocation of said knife member at the relatively opposite side of the path of movement of the web whereby the doubled web may be cut into individual bag members, means for moving said backing member against said knife means when the latter is actuated, and for moving the backing member away from the knife member when the latter is inactive whereby to facilitate advancing of the web past the cutter, means provided adjacent and slightly in advance of said cutter for intermittently clamping the doubled web and holding the same stationary during and immediately after actuation of the knife member, horizontally reciprocable gripper means successively engageable with free end portions of the doubled web beyond the cutter for intermittently advancing the web taut beyond the cutter upon release of said clamping means, means for actuating said web advancing means, web gripping means, web clamping means, web cutting means and said backing member in timed relation, and web slack take-up means located intermediate said continuous web feeding means and said intermittent web clamping means.

8. In a printed bag making machine, the combination of feed means for continuously advancing a web to be printed including means for printing indicia on longitudinally spaced areas of the continuously advancing web, means for intermittently cutting the web transversely at points between the printed areas into individual bag members each having a printed area thereon, means for intermittently clamping the web at a point between the printed areas to hold the same during actuation of the cutting means, and means intermittently engageable with an unprinted portion of the free forward end of the web at a point for intermittently advancing the same past said cutting means, web slack take-up means intermediate the printing means and the web clamping means, said intermittent web clamping means, web slack take-up means, and intermittent web advancing means being operative without smearing of the indicia printed on the web.

9. In a bag making machine, the combination of means for printing indicia on longitudinally spaced areas of a continuously moving web, means for intermittently cutting the web transversely at points between the printed areas to form successive individual bag members each having a printed area thereon, means for intermittently clamping the web at a point adjacent to but in advance of the cutting means to hold the same stationary during actuation of the cutting means, means engageable with the moving web for taking up slack therein between the printing means and the clamping means when the clamping means are inoperative, and means intermittently engageable with the free forward end of the web for successively advancing portions of the web past the cutting means when the clamping means are inoperative, the web advancing means and the clamping means and the slack take-up means being engageable with unprinted portions of the web whereby to prevent the printed indicia from smearing.

10. In a bag making machine, the combination of means for supporting a web in roll form, means spaced from the roll supporting means for printing indicia on longitudinally spaced areas of the web and including a horizontally disposed web engaging and propelling roller for continuously advancing the web from the roll, means in advance of said printing means for forming hems at opposite side edges of the web, means beyond the printing and advancing means for doubling the web longitudinally upon itself and transposing the same into a vertical plane with the hems adjacent one another and the printed indicia on the inside of the doubled web, horizontally reciprocable gripper means beyond the doubling means and intermittently engageable with the forward end of the doubled web for advancing the same without smearing the printed indicia, means comprising a vertically reciprocable knife intermediate the printing means and said intermittent gripper means for cutting the web transversely at points between the printed area into individual bag members each having a printed area thereon, a horizontal bag receiving table adjacent the knife, means for feeding successive bag members from the knife to said table, means on said table for stitching cut side edges of the bag members, and means for continuously advancing the cut bag members along said table to said stitching means, said means engaging the bag members at the side edges only, to avoid smearing the printed portions.

References Cited in the file of this patent

UNITED STATES PATENTS

| | | |
|---|---|---|
| 445,351 | Kerr | Jan. 27, 1891 |
| 534,890 | Kerr | Feb. 26, 1895 |
| 1,054,867 | Plass | Mar. 4, 1913 |
| 2,053,257 | Anderson | Sept. 8, 1936 |
| 2,422,426 | Lombardo | June 17, 1947 |
| 2,546,527 | Smyth | Mar. 27, 1951 |
| 2,593,085 | Anderson et al. | Apr. 15, 1952 |
| 2,667,132 | Golden | Jan. 26, 1954 |